United States Patent [19]
Repecka

[11] Patent Number: 5,747,615
[45] Date of Patent: May 5, 1998

[54] SLURRY-MIXED HEAT-CURABLE RESIN SYSTEMS HAVING SUPERIOR TACK AND DRAPE

[75] Inventor: Linas Norman Repecka, Lakewood, Calif.

[73] Assignee: Cytec Technology Corp., Wilmington, Del.

[21] Appl. No.: 460,169

[22] Filed: Jun. 2, 1995

Related U.S. Application Data

[63] Continuation of Ser. No. 14,062, Feb. 5, 1993, abandoned, which is a continuation of Ser. No. 595,501, Oct. 11, 1990, abandoned, which is a continuation-in-part of Ser. No. 187,819, Apr. 29, 1988, Pat. No. 5,003,018.

[51] Int. Cl.$^6$ .................... C08F 22/40; C08G 73/12
[52] U.S. Cl. ............... 526/262; 525/422; 525/432; 525/530; 525/537; 528/124; 528/322
[58] Field of Search .................... 526/262; 525/422, 525/432, 537, 530; 528/124, 322

[56] References Cited

U.S. PATENT DOCUMENTS

| | | | |
|---|---|---|---|
| 4,042,031 | 8/1977 | Knapp | 166/276 |
| 4,105,618 | 8/1978 | Sifferman et al. | 260/33.6 |
| 4,374,216 | 2/1983 | Dammann et al. | 524/35 |
| 4,400,313 | 8/1983 | Roberson et al. | 252/628 |
| 4,474,905 | 10/1984 | Hadermann et al. | 523/152 |
| 4,691,025 | 9/1987 | Domeier et al. | 548/521 |
| 5,003,018 | 3/1991 | Repecka | 526/262 |
| 5,026,410 | 6/1991 | Pollet et al. | 65/3.43 |

FOREIGN PATENT DOCUMENTS 63-015846  1/1988  Japan.

*Primary Examiner*—Ana Woodward
*Attorney, Agent, or Firm*—Michael J. Kelly; Kristin H. Neuman

[57] ABSTRACT

Heat-curable resin systems containing at least one liquid monomer and one solid component, and which have superior tack and drape, may be prepared by slurry mixing a slurry compatible solid into at least one liquid monomer such that the finished resin system contains the solid as a discontinuous phase having a particle size of less than about 20 μm.

10 Claims, No Drawings

SLURRY-MIXED HEAT-CURABLE RESIN SYSTEMS HAVING SUPERIOR TACK AND DRAPE

This application is a continuation of application Ser. No. 08/014,062, filed Feb. 5, 1993, now abandoned, which, in turn is a continuation of application Ser. No. 07/595,501, filed Oct. 11, 1990, now abandoned, which, in turn, is a continuation-in-part of application Ser. No. 07/187,819, filed Apr. 29, 1988, now issued as U.S. Pat. No. 5,003,018 on Mar. 26, 1991, all of which are herein incorporated by reference.

BACKGROUND OF THE INVENTION

1. Field of the Invention

The subject invention relates to a process for the preparation of heat-curable resin systems having superior tack and drape and to the products prepared by such a process. More particularly, the subject invention relates to a process for slurry mixing resin components to form such resin systems.

2. Description of the Related Art

Adhesive films and prepregs containing heat-curable resins find increasing usefulness, particularly in the transportation field, and more particularly in the aerospace field. The heat-curable resins useful in such systems comprise a wide variety of chemical types, including bismaleimide, cyanate, epoxy, isocyanate, unsaturated polyester, hybrid resin systems containing diverse monomers from two or more of these classes, and modified resin systems containing cross-curative monomeric and oligomeric tougheners in addition to the previously identified resins.

Two physical properties desired of film adhesives and prepregs are tack and drape at their intended use temperature. Tack is necessary when laying up vertical panels or adhesively joining parts. Drape is necessary in order that parts having shapes other than essentially planar may be easily fabricated. Film adhesives and prepregs not having these properties do not represent viable commercial products.

While it is possible to formulate tacky resin systems containing viscous liquid monomers such as the DGEBA and DGEBF epoxy resins, many of these resin systems lack the requisite thermal stability, high temperature modulus, strength, and toughness necessary for aerospace applications, due in part to the low molecular weights and low functionalities of the monomers. Thus it is becoming common to modify such resin systems by including higher functionality, higher molecular weight comonomers, many of which are solids at ordinary temperatures, to obtain the desired performance. Unfortunately, when such monomers are added to conventional resin systems, the tack and drape of films and prepregs prepared from these systems generally prove to be unsatisfactory.

SUMMARY OF THE INVENTION

It has now been discovered that the tack and drape of resin systems containing at least one liquid monomer and at least one solid comonomer may be vastly improved if a portion of the solid comonomer is added to the liquid monomer in the form of a slurry of particles having a mean size less than about 20 µm, at a temperature such that an appreciable part of the solid comonomer remains in the solid state as a stable dispersion. This process is called "slurry mixing" and has broad applicability to many resin systems.

DESCRIPTION OF THE PREFERRED EMBODIMENTS

By the term "liquid monomer" is meant a reactive resin system component which is liquid at the slurry mixing process temperature. This "reactive resin system component" may contain but a single reactive monomer, several reactive monomers of the same or different chemical functionalities, cross-curative monomeric or oligomeric modifiers, or in addition to such components, other non-reactive system auxiliary components such as plasticizers, fillers, pigments, thermoplastic tougheners, rheology control agents, tackifiers, and the like.

The reactive monomers of the liquid monomer component may be co-reactive in that they do not react with each other, but react upon cure with themselves or other system components, or they may be cross-curative, in that they react with each other upon reaching the cure temperature. The reactive monomers of the liquid monomer component, however, must not react to any substantial degree during the slurry mixing process, or premature advancement of the resin may occur.

By substantial degree of reaction is meant a degree such that the resin system is advanced so as no longer to be suitable for the preparation of film adhesives, hot melt prepregging films, or for the direct impregnation of fiber reinforcement from the melt. In these cases, the resin essentially is no longer thermoplastic; is a thermoplastic of such high melting point that final cure occurs if one of the uses identified immediately above is attempted; or is of such high viscosity at suitably elevated temperatures that hot melt or film impregnation is not possible.

The uncured liquid monomer component of the subject invention should have a low glass transition temperature, and/or a low softening point. Preferably, the glass transition temperature is about 5° C. or less, although certain applications a higher glass transition temperature may be acceptable, for example for use with automated layup machines equipped with prepreg preheaters. In any case, the glass transition temperature of the finished resin system should be at least about 20°–30° C. below the intended use temperature and preferably lower. Most preferably, the glass transition temperature of the liquid monomer component is −10° C. or less.

It is impossible to give an exhaustive list of possible liquid monomers, due to the myriad possibilities which exist. However, after omitting system auxiliary components and monomeric and oligomeric modifiers, the following types of liquid monomers may be considered as typical, but not limiting.

Many epoxy resins having functionalities of about two or greater are suitable. Examples of liquid epoxy resins are contained in many references, such as the treatise *Handbook of Epoxy Resins* by Lee and Neville, McGraw-Hill, and *Epoxy Resins, Chemistry and Technology*, May, Ed., Marcel Dekker, ©1973. Included among these liquid systems are many of the DGEBA and DGEBF resins, the lower molecular weight phenolic and cresolic novolac based resins, and the trisglycidyl aminophenol resins. Mixtures of these liquid epoxy resins and minor amounts of solid epoxy resins such as tetraglycidyl methylenedianiline (TGMDA) or other solid epoxy resins may also be useful. In this case, the amount of solid epoxy resin should be such that neither the storage temperature solubility of the solid epoxy in the remaining liquid monomers is appreciably exceeded, nor is the glass transition temperature of the uncured resin system raised to an unacceptably high value.

Mixtures of epoxy resins and epoxy curing agents which are soluble in the epoxy and unreactive or poorly reactive at the slurry temperature may also be used. Examples of such systems are those containing one or more of the various glycidyl-functional epoxy resins, and aromatic amine curing agents such as diaminodiphenylmethane, diaminodiphenylsulfide, diaminodiphenyloxide, and diaminodiphenylsulfone, particularly the latter. However, as some of these aromatic amines are solids, the same limitation applies to them as applies to mixtures containing solid epoxies: the amount of solid curing agent dissolved in the liquid monomer component should be such that the storage temperature solubility of the curing agent in the remaining liquid monomer components is not exceeded, and the glass transition temperature of the uncured resin system should not be raised to unacceptable values.

Unsaturated polyesters are suitable liquid monomers. These polyesters, again, must be liquid at the slurrying temperature. Such polyesters are prepared by esterifying a polybasic acid and a polyfunctional alcohol at least one of which contains ethylenic or acetylenic unsaturation. Such polyesters, to have the lowest melting points, are often synthesized from mixtures of acids and alcohols. Examples of such unsaturated polyesters may be found in *Unsaturated Polyesters* by Herman Boenig, Elsevier, New York, 1964. Many commercial resins of this type are available, often containing other polymerizable species such as styrene.

Isocyanates may be suitable liquid monomers. Examples of suitable isocyanates are the toluene isocyanates, for example 2,4-, and 2,6-toluenediisocyanates and their mixtures; the diisocyanatodiphenylmethanes, for example 2,2'-, 2,4'-, 4,4'-, and 3,3'-diisocyanatodiphenylmethane and their mixtures; isophorone diisocyanate, and polyphenylenepolymethylenepolyisocyanate.

Bismaleimides may be suitable liquid monomers, particularly eutectic mixtures of two or more bismaleimides. Such bismaleimides are well known items of commerce and may be prepared, for example, through the reaction of maleic anhydride with a suitable di- or polyamine. Useful, for example, are the maleimides of the toluenediamines, the phenylenediamines, the diaminodiphenylmethanes, diaminodiphenyloxides, diaminodiphenylsulfides, diaminodiphenylsulfones, and their analogues. Also suitable are the maleimides of amine terminated polyarylene oligomers having interspersed oxide, sulfide, sulfone, or carbonyl groups as taught by U.S. Pat. Nos. 4,175,175, 4,656,208 and EP-A-0 130 270. Bismaleimides of aliphatic di- and polyamines are also suitable, for example those derived from trimethylhexanediamine, hexanediamine, octanediamine, decanediamine, 1,4-diaminocyclohexane, and isophorone diamine.

Liquid monomers containing bismaleimides most often contain other ingredients, for example tougheners such as the o,o'-diallylbisphenols and the o,o'-dipropenylbisphenols, or allylphenoxy, propenylphenoxy, allylphenyl and propenylphenyl-terminated oligomeric toughening agents. Where such other modifiers are solids, as is the case with some of the oligomeric toughening agents, the quantity contained in the liquid monomer must be such that the storage temperature solubility of the modifier is not appreciably exceeded.

Cyanate resins are also suitable liquid monomers. Such resins are prepared through the reaction of a cyanogen halide with an aromatic di- or polyol such as recorcinol, hydroquinone, dihydroxynaphthalene, the cresolic and phenolic novolaks, and the various bisphenols. Eutectic mixtures of such cyanates are also feasible as liquid monomers.

The above-identified liquid monomers serve to illustrate the variety of chemical types which are suitable for the practice of the subject invention. Other monomers having other chemical functional groups which can meet the requirements of being liquid and substantially unreactive at the slurry mixing temperature will readily suggest themselves to those skilled in the art.

Of course, mixtures of various monomers may also be used. Examples of such mixtures include epoxy resins and di- or polyphenols; epoxy resins and cyanate resins; cyanate resins and bismaleimide resins, and epoxy resins and isocyanate resins. Of course, as stated earlier, such resin mixtures should be capable of mutual solubility at the slurry mixing temperature; should not react substantially at the slurry mixing temperature; and where any of the components are solids, those components should not be present in an amount appreciably in excess of the storage temperature solubility of that component, or to such a degree as to elevate the glass transition temperature of the uncured resin system to unacceptable levels.

The "slurry compatible solid" may be a reactive solid monomer or a thermoplastic toughener. In the case of thermoplastic tougheners, the thermoplastic must be one which is soluble in the liquid monomer at elevated temperatures. Preferably, the thermoplastic will be soluble at a temperature higher than the slurry mixing temperature, but not at the slurry mixing temperature itself. Alternatively, the thermoplastic may be substantially soluble at the slurry mixing temperature, but the slurrying process may be performed over a time such that only a minimal amount of thermoplastic will dissolve. In either case, the thermoplastic must be a solid at the slurry mixing temperature.

Preferred thermoplastics are the engineering thermoplastics such as the polyimides, polyetherimides, polyesterimides, polysulfides, polysulfones, polyphenylene oxides, polyethersulfones, polyetherketones, polyetheretherketones, polyetherketoneketones, polyketonesulfones, and similar polymers. Such thermoplastics preferably have glass transition temperatures greater than 150° C., preferably greater than 250° C.

If the slurry compatible solid is a reactive monomer it will have a molecular weight greater than 250 Daltons and preferably will have the same reactive functionality as the majority of the reactive chemical monomers in the finished resin system. The reactive slurry compatible solid will also be chemically and physically compatible with the liquid comonomer in the sense hereinafter designated.

By "chemically compatible" is mean that the reactive monomer slurry compatible solid will not react, or "crosscure" to any substantial degree with the major liquid monomer(s) at the slurry mixing temperature. Preferably the chemical functionality is the same as the major portion of the liquid monomer. When the chemical functionalities are not the same, the slurry compatible solid must not be reactive with the major liquid monomer as the reactions of these respective groups are commonly viewed. Examples of systems where the slurry compatible solid and liquid monomer have the same functionalities include the slurry mixing of a solid epoxy resin into a liquid epoxy resin or the slurry mixing of a solid cyanate resin into a liquid cyanate resin. An example where the respective functionalities are not the same would be the slurry mixing of a solid bismaleimide into a mixture of an epoxy resin and diphenol. Examples of slurry compatible solids which are not chemically compatible and thus outside of the scope of the subject invention are diaminodiphenylsulfone or diaminodiphenylketone when used as curing agents for epoxy resin systems.

By "physically compatible" is meant that the reactive monomer slurry compatible solid be substantially soluble in the total resin system at some temperature equal or lower than the curing temperature, but not substantially soluble under slurry mixing conditions. By "not substantially soluble" is meant that the quantity of reactive monomer slurry compatible solid which dissolves in the liquid monomer during the slurry mixing process, when combined with any amount of the same monomer already present as a component of the liquid monomer, does not appreciably exceed the storage temperature solubility of that component in the total resin system such that particles of size greater than 20 µm are formed during cooling or upon storage. Preferably, the reactive monomer slurry compatible solid will by substantially insoluble under slurry mixing conditions, meaning that virtually none will dissolve, due either to the low mixing temperature, a short mixing time, or both.

For example, in a bismaleimide resin system composed of several bismaleimides and a comonomer such as diallylbisphenol A, the liquid monomer might contain diallylbisphenol A and several bismaleimides in solution. If a further amount of one of these bismaleimides is slurried into the liquid monomer, it is desirable that virtually none of the added, solid bismaleimide, dissolve. However, some dissolution is allowable, as long as, upon cooling, the solubility of that particular component is not appreciably exceeded, i.e. substantial numbers of crystals or crystallites of a size greater than 20 µm, preferably 10 µm, are not formed.

Examples of components which are reactive, but are not slurry compatible solids in epoxy resin systems as herein defined are the various aromatic diamine curing agents, such as diaminodiphenylsulfone, and dicyandiamide. These compounds do not meet the molecular weight limitations necessary to be a "slurry compatible solid," and also will cross-cure with a major portion of the liquid monomer. Of course, such curing agents may be slurry mixed with the liquid monomer if desired, so long as a slurry compatible solid as hereindefined is also slurry mixed. Other examples of components which are not "slurry compatible solids" in epoxy systems as defined by the subject invention, are the aliphatic diamines, even those of high molecular weight, as these compounds are too reactive and would undesirably advance the resin at the slurry mixing temperature.

Further examples of potential components which are not slurry compatible solids are solid elastomers such as the carboxyl and amino terminated acrylonitrile/butadiene/styrene elastomers, for example those sold under the designation HYCAR® rubber, a trademark of the B. F. Goodrich Chemical Co., 6100 Oak Tree Blvd., Cleveland, Ohio 44131. These elastomers are insoluble and infusible in most systems, and hence are neither a thermoplastic slurry compatible solid nor a reactive monomer slurry compatible solid.

The slurry mixing process may take place under a variety of conditions. Preferably, the slurry compatible solid is finely ground and dispersed by conventional methods into the additional resin components by suitable dispersing means. For example, the solid may be ground to fine particle sizes in a jet mill as disclosed in U.S. Pat. No. 4,607,069. Most preferably, the solid is ground to a particle size less than 20 µm, preferably less than 10 µm, and most preferably less than 5 µm. The finely ground resin may then be dispersed, for example using a high shear mixer, at temperatures ranging from below ambient to over 200° C. depending upon the reactivities and viscosities of the liquid monomer components.

Alternatively, the slurry compatible solid may be added to the liquid monomer in small particles ranging from 5 µm, to 3 mm in size, with further size reduction accomplished by use of high shear mixing. An apparatus suitable for such high shear size reduction are the ULTRA-TURRAX® mixers available from IKA-Maschinenbau Janke and Kunke, GMBH and Co. KG., D-7812 Bad Kruzinger 2, Federal Republic of Germany. Such high shear mixers generate considerable heat, and thus cooling is often necessary to prevent the slurry mixing temperature from rising so high that the solid dissolves in the liquid monomers or that premature reaction occurs.

An additional means of slurry mixing which is possible when the solid component has a relatively steep solubility curve in the liquid monomers and does not tend to form supersaturated solutions, is to melt the solid monomer in a separate container and add it to the liquid monomers while cooling under high shear. With some systems, it may even be possible to melt all the components together and cool while mixing under high shear. This method is not suitable, however, when supersaturation is likely, as the resulting heat-curable resin system is at most metastable and may alter its morphology in an unpredictable manner due to crystallization of the supersaturated components. The temperature of the liquid monomer using this technique, must be below the solidification temperature of the slurry compatible solid when mixing ceases, and in such cases, the "slurry mixing temperature" is this latter temperature.

In any event, following the slurry mixing process, the resulting resin system consists of a continuous phase containing the liquid monomer(s) and a discontinuous (solid) phase containing a major portion of the slurry compatible solid in the form of particles having a mean size of less than about 20 µm, preferably less than 10 µm, and particularly, less than 5 µm. The particle size of the discontinuous phase may vary from one system to another, but it is important in the case of prepregging resins that the mean particle size be less than the distance between adjacent fiber bundles or filaments.

The invention may be illustrated by reference to the following examples.

EXAMPLE 1 (COMPARATIVE)

Into a resin kettle maintained at a temperature of 121° C. was introduced 713 grams of a molten eutectic mixture of bismaleimides. After the bismaleimide had melted, 268 grams of o,o'-diallylbisphenol A was introduced slowly while stirring. Following the addition of the diallylbisphenol, stirring was continued while the temperature was allowed to drop to approximately 80° C. At this temperature, an additional 20 grams of diallylbisphenol containing 5 weight percent of catalyst was added. The mixture was coated onto silicone coated release paper and used to fabricate a unidirectional carbon/graphite prepreg by the hot melt impregnation method. The prepreg thus prepared had poor drape and less than the desired amount of tack.

EXAMPLE 2

Into a resin kettle was introduced 268 grams of o,o'-diallylbisphenol A comonomer at room temperature. Mixing was commenced with an ULTRA-TURRAX® 600 watt mixer as a result of which the temperature of the comonomer rose to above 38° C. Next, 713 grams of the same eutectic mixture of bismaleimides as used in Example 1 was added using external cooling when necessary, to keep the temperature below 93° C. Prior to addition, the bismaleimide had been coarsely crushed and sieved to a particle size of less than about 3 mm. After the addition of bismaleimide was completed, an additional 20 grams of diallylbisphenol A containing 5 weight percent of curing catalyst was added at a temperature below 82° C. The finished resin system was coated onto silicone coated release paper and used to prepare a carbon/graphite prepreg as in Example 1. Microscopic examination reveals no large crystals of bismaleimide, but discloses instead a uniform dispersion of particles having a size below about 20 μm. The prepreg prepared from the resin of Example 2 displayed superior drape and improved tack as compared to the otherwise identical prepreg of Example 1.

EXAMPLE 3 (COMPARATIVE)

A resin formulation was made by dissolving 2.1 g of the finely ground bismaleimide of 4,4'-diaminodiphenylmethane into 3.5 g of bis[4-cyanato-3,5-dimethylphenyl]methane comonomer. Dissolution was accomplished by stirring the ingredients together at 300° F. (149° C.) for a period of five minutes. The resin was then poured into an aluminum foil dish whereupon it solidified into a brittle, transparent brown solid of glassy appearance. Upon flexing the dish the resin immediately cracked. The resin was not at all sticky to the touch (tack-free).

EXAMPLE 4

A resin formulation was prepared identical to that of Example 3, but the same finely ground bismaleimide (>50% having particle size between 2 and 3 μm) was slurry mixed into the cyanate comonomer component over a 15 minute period at a temperature of 200° F. (93° C.). The resin was then poured into an aluminum dish as before. After cooling to room temperature, the resin was a semi-sold which did not crack when flexed, and which was sticky to the touch (tacky).

EXAMPLE 5

A solid bismaleimide having a mean particle size of 8 μm was fed into a lab jet mill at a rate of 18 g/minute by means of a vibratory funnel. The mill contained a 10 cm inside diameter by 2.5 cm deep milling chamber, and was fed compressed air at 90 psig via a 12.5 mm inside diameter hose. The venturi line pressure was maintained at about 60 psig. The milled particles were collected in product bags and were found to have a particle size such that 85 percent of the particles were below 4 microns in size.

EXAMPLE 6

A eutectic mixture containing approximately 64 weight percent, 15 weight percent, and 21 weight percent respectively of the bismaleimides of methylenedianiline, trimethylhexamethylene diamine, and toluene diamine is melted, and then cooled to 250° F. (121° C.). To 1000 g of this bismaleimide mixture, is added, with stirring, 800 g of o,o'-diallylbisphenol A. This mixture is allowed to cool to 160° F. (71° C.) at which temperature 400 g of the jet milled bismaleimide of Example 5 is added, and dispersed well using a Fawcett air mixer, model No. 103A, with a high shear blade. Mixer speed is 700 rpm. The resin system is then catalyzed at 160° F. (71° C.) and coated at this temperature onto a silicone coated release paper to produce a tacky resin system having good drape.

COMPARATIVE EXAMPLE 7

A solution containing 50 g of liquid bisphenol F epoxy resin was slurried with 120 g of ground diglycidyl-9,9'-bis(4 hydroxyphenyl) fluorene, 27.6 g diaminodiphenylsulfone and 1.0 g of catalyst at 120° F. until the solid epoxy dissolved and the mixture appeared uniform. It was then coated on a carrier to form a film adhesive. The resulting film adhesive had no tack and no drape.

COMPARATIVE EXAMPLE 8

Similar to Example 7 except liquid bisphenol A was used in place of the bisphenol F. The resulting film had low tack and no drape.

COMPARATIVE EXAMPLE 9

140 g of diglycidyl-9,9'-bis(4 hydroxyphenyl) fluorene, was dissolved in 60 g of N,N,N',N'-tetraglycidylm-xylenediamine at 180° F. Once the fluorene resin had dissolved 49 g of 4,4'-diaminodiphenylsulfone and 3 g of catalyst were added. Mixing was continued until the solution was uniform. The resulting mixture was difficult to process due to its high viscosity. The tack of the mixture was low.

EXAMPLE 10

A slurry was prepared by heating 60 g of N,N,N',N'-tetraglycidyl-m-xylenediamine to 140° F. and adding 140 g of diglycidyl-9,9'-bis(4 hydroxyphenyl) fluorene, 49 g 4,4'-diaminodiphenylsulfone,. 3 g dicyanodiamide. The mixing was maintained at 140° F. and continued until the slurry appeared uniform. It was then coated on a carrier to form a film adhesive. The resultant film adhesive was drapable with a high tack level.

COMPARATIVE EXAMPLE 11

A solution containing 48 g of diallylbisphenol A and 20 g of polytetrahydrofuran-diamine was heated to 210° F. and 28 g of DER 661 epoxy was then added to it to be dissolved. The solution was cooled down to 180° F. before the following powders were slurried in: 20 g of a rubber, 66 g of a bismaleimide mixture, 18 g of a thermoplastic. The mixing was maintained at 180° F. for about five minutes or until it appeared uniform. It was then coated on a carrier to form a film adhesive. The mixing in this example was difficult because of the high viscosity. The resultant film adhesive was not very drapable and the tack was only moderate.

EXAMPLE 12

Similar to Example 11 except that when DER 661 was slurried in at 180° F. with everything else being the same, the mixing was much easier because of the lower viscosity. At the lower temperature, a substantial amount of DER 661 remained in solid form. The resultant film adhesive was very drapable and the tack level very high.

The embodiments of the invention in which an exclusive privilege or property is claimed are defined as follows:

1. A process for the preparation of heat-curable resin system comprising a reactive comonomer having a molecular weight of greater than 250 Daltons and an organic liquid reactive monomer, by the step of slurry mixing the reactive comonomer into the organic liquid reactive monomer under conditions such that:

(i) the reactive comonomer is substantially insoluble in the organic liquid reactive monomer, (ii) the reactive comonomer and the organic liquid reactive monomer do not react to any substantial degree, and (iii) a dispersion results of a continuous phase comprising the organic liquid reactive monomer and a discontinuous phase comprising the reactive comonomer in particulate form with a mean particle size of less than about 20 μm.

2. The process of claim 1, wherein a dispersion results of a continuous phase comprising the organic liquid reactive monomer and a discontinuous phase comprising the reactive comonomer in particulate form with a mean particle size of less than 10 μm.

3. The process of claim 2, wherein a dispersion results of a continuous phase comprising the organic liquid reactive monomer and a discontinuous phase comprising the reactive comonomer in particulate form with a mean particle size of less than about 5 μm.

4. The process of claim 1, wherein the slurry mixing is accomplished by dispersing the reactive comonomer in the form of particles having a mean particle size of less than about 20 μm into the organic liquid reactive monomer.

5. The process of claim 4, wherein the slurry mixing is accomplished by dispersing the reactive comonomer in the form of particles having a mean particle size of less than about 10 μm into the organic liquid reactive monomer.

6. The process of claim 5, wherein the slurry mixing is accomplished by dispersing the reactive comonomer in the form of particles having a mean particle size of less than about 5 μm into the organic liquid reactive monomer.

7. The process of claim 1, wherein the dispersing of the reactive comonomer into the organic liquid reactive monomer takes place at a temperature of from about 50° C. to about 200° C.

8. The process of claim 1, wherein the slurry mixing is accomplished by dispersing the reactive comonomer in the form of particles having a mean particle size of greater than about 5 μm into the organic liquid reactive monomer by high shear mixing.

9. The process of claim 1, wherein the slurry mixing is accomplished by melting the reactive comonomer then adding the so-melted reactive comonomer to the organic liquid reactive monomer under high shear while cooling.

10. The process of claim 1, wherein the organic liquid reactive monomer comprises a reactive resin selected from the group consisting of an epoxy resin, an unsaturated polyester, an isocyanate, a bismaleimide and a cyanate resin.

* * * * *